United States Patent [19]
Witzel, III

[11] 3,711,350
[45] Jan. 16, 1973

[54] PROCESS FOR THE FABRICATION OF COMPLEX CONTOURED BODIES

[75] Inventor: John Witzel, III, Cumberland, Md.

[73] Assignee: Hercules Incorporated, Wilmington, Del.

[22] Filed: Dec. 10, 1969

[21] Appl. No.: 883,729

[52] U.S. Cl. .................. 156/169, 156/64, 156/212, 156/296
[51] Int. Cl. ............................................. B65h 81/02
[58] Field of Search........156/64, 169, 172, 173, 174, 156/180, 212, 245, 296, 313

[56] References Cited

UNITED STATES PATENTS 3,521,877  7/1970  Moran....................................73/516

*Primary Examiner*—Benjamin A. Borchelt
*Assistant Examiner*—H. J. Tudor
*Attorney*—Michael B. Keehan

[57] ABSTRACT

A process for fabrication of preforms for complex contoured bodies is provided. In this process a pattern is prepared from the complex contoured body by first securing a covering to the surface of the body and then describing a continuous path on this covering so that a pattern can be recovered by cutting the covering along the continuous path. The pattern recovered has an interior edge, an exterior edge, a forward-end and an aft-end. The continuous path is described so that the width of the pattern is a constant. Filaments can then be laid by any suitable method in side-by-side relationship lengthwise of the pattern. The filaments covering the interior and exterior edges of the pattern are substantially parallel with these edges. The filaments are bound together with a resin providing a self-supporting preform for a complex contoured body.

16 Claims, 9 Drawing Figures

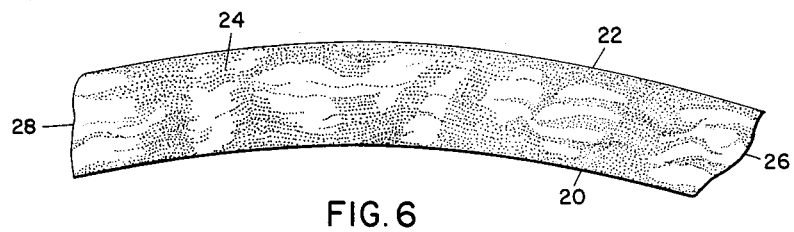
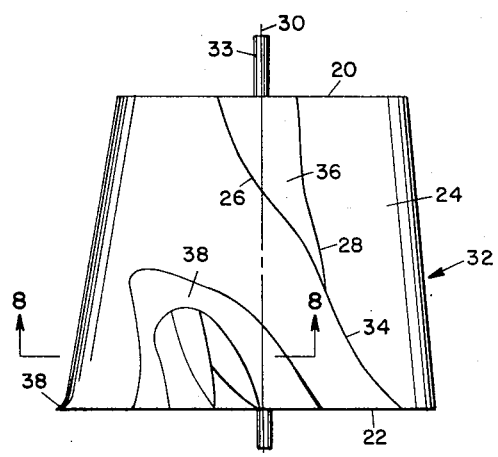
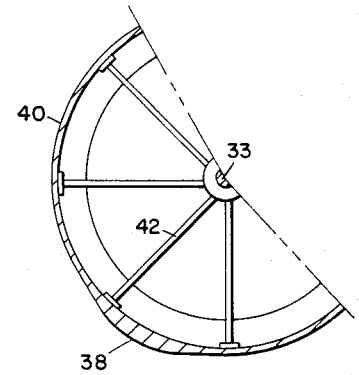
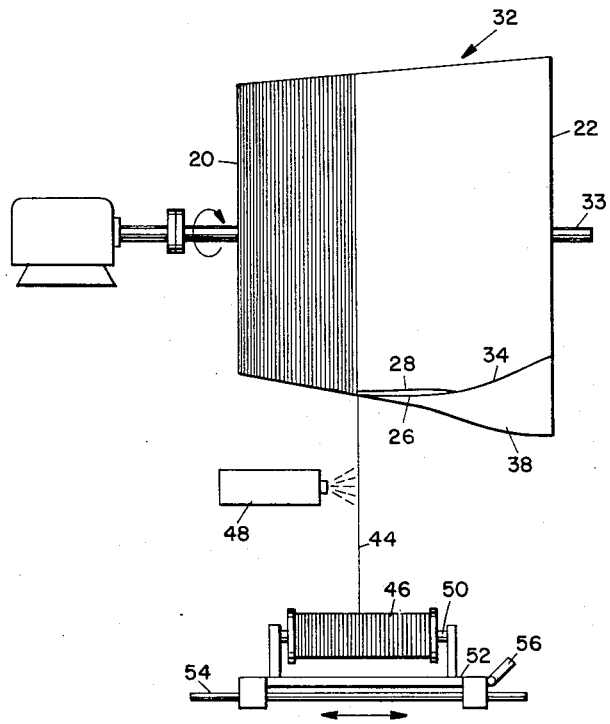
JOHN WITZEL III
INVENTOR

PROCESS FOR THE FABRICATION OF COMPLEX CONTOURED BODIES

This invention relates to a process for the fabrication of preforms for complex contoured bodies prepared from a fibrous material and a resin binder. More particularly, this invention relates to a process for preforming to an exact pattern high modulus composites comprising high tensile strength fibers and a resin binder.

In the aerospace industry high modulus composite materials are being employed in the fabrication of complex structures because of the advantages offered of low weight, stiffness and high strength. In the past many components of high modulus composite materials have been prepared by filament winding. Conventional filament winding techniques, are particularly satisfactory for manufacture of components in which the basic underlying structure is a body of revolution. When filament winding a preform for a non-cylindrical body of revolution it is necessary that the winding angle by continuously changed along the axis of the body of revolution in accordance with the surface characteristics of the non-cylindrical body of revolution in order to prevent overlapping and/or gapping of the filaments. By changing the winding angle in a mathematically determined fashion, bodies of revolution can be fabricated with standard filament winding equipment. Conventional winding equipment and methods are not suitable, however, for fabricating a three-dimensional body having a smooth exterior surface but having no axis of symmetry. Three-dimensional bodies of this type are referred to herein as "complex contoured bodies." Complex contoured bodies include such items as helicopter blade root sections, wing edges and the like. High modulus composite materials such as boron, glass, or carbon filaments or tapes must be hand fitted to the complex contours of such components in order to obtain the maximum stress from the material.

Complex contoured bodies have a continuously changing cross-section. Hand fitting has been required in order to obtain adequate conformity of the composite materials to the contoured surface. The reason for the non-conformity of the tape or broad goods is analyzed as follows. The peripheral distance (d) about the body measured at any line circumscribing the surface of said body and lying in a plane perpendicular to the longitudinal axis of said body, it continually changing. Thus, if the path length of two adjacent filaments wound about the peripheral surface of a complex contoured body were measured, there would be a slight difference in length of the filaments due to the contours of the component. This difference in length between any two adjacent filaments will change depending upon the surface geometry of the contoured surface. Unlike a body of revolution, this change in contour is not readily definable mathematically. In the case of tapes, the difference in lengths between two adjacent tapes laid on a contoured surface is often great enough that the second tape will not conform to the surface of the contoured body without either buckling or causing a gap between the tapes of filaments.

Several alternative methods of laying filaments or tapes on a complex contoured body are possible. One approach to this problem would be to prepare custom made tapes in which the length of each filament within the tape or broad goods is adjusted so that the resulting tape or broad goods would conform to the surface of the complex contoured body. Another method would be to continually reduce the width of the tape or the filaments to minimize the difference in length between any two filaments being wound about the complex contoured body. As heretofore mentioned there is no known winding equipment which can be employed satisfactorily for winding filaments on such a body. Similarly, custom made broad tapes are required for this application are not commercially available, and would be extraordinarily expensive to produce.

Accordingly, it is an object of this invention to provide a method for preparing a preform from fibrous materials and a resin binder which will conform to the surface of a complex contoured body.

It is another object of this invention to provide a method for manufacture of complex contoured bodies from high modulus composite materials employing conventionally prepared filaments or tapes.

It is another object of this invention to provide a method for preparing a preform from high modulus composite materials which will conform to the surface of a complex contoured body.

It is another object of this invention to provide a simplified method for manufacture of complex contoured bodies from high modulus composite materials employing conventional filament winding equipment.

It is another object of this invention to provide a simplified method for manufacture of small numbers or large quantities of complex contoured bodies from high modulus composite materials.

Other objects of this invention will, in part, be obvious and will, in part, appear hereinafter. For a complete understanding of the nature nd objects of this invention, reference is made to the following detailed description.

In accordance with this invention a method has been found for preparing a preform from filaments and a resin binder which will conform to the surface of a complex contoured body. The preform of this invention is prepared by laying filaments on a pattern or mandrel prepared from a pattern made from the complex contoured body, and binding the filaments with a resin to provide a self-supporting preform. The first step in preparing the pattern for the preform is to secure a covering of a pliable material to the surface of the complex contoured body. The pliable material must conform substantially to the surface of the complex contoured body. Next, a continuous path is described about the surface of the covering. The pliable covering is cut along this continuous path to provide the pattern on which the preform is ultimately prepared. The continuous path described is therefore critical to this invention and must be described so that the pattern recovered by cutting along the continuous path will have two edges, referred to herein as an interior edge and an exterior edge, and two ends. The width of the pattern measured between the interior edge and exterior edges thereof along a line passing through said pattern and perpendicular to any tangent to either edge of the pattern is a constant. Discontinuity in the pattern width can occur only at the ends of the pattern.

The pattern thus defined is removed from the complex contoured body by cutting the pattern along the continuous path described. The pattern thus removed has gentle contours along the length of the pattern. Filaments or tapes are laid on the surface of the pattern in contact with resin in side-by-side relationship lengthwise of said pattern and substantially parallel to said continuous path at the exterior and interior edges of the pattern. Sufficient filaments are laid on the pattern until the pattern is completely covered with filaments. The term "continuous path" is defined herein to mean the path about a complex contoured body which serves as a reference line on which and from which filaments can be laid in side-by-side relationship in preparing a filament based composite without gaps or laps occurring between the filaments in the composite.

In the preferred practice of this invention, a mandrel is first prepared having the same shape as the complex contoured body. This mandrel is covered with a pliable covering such as glass scrim or cloth. The scrim is coated with a resin which will cause the scrim to conform to the surface of the complex body and to bond it together as an integral covering. A continuous path is then described about the resin coated covering as previously described. The scrim is cut along this continuous path providing a pattern. A second pattern is prepared from a rigid material such as sheet aluminum conforming to the surface of the cloth pattern. The ends of the new pattern are then joined to form a new smooth surface about a longitudinal axis. The pattern ends are joined to form a surface which is continuous at the intersection of the ends. It is not necessary that the ends of the pattern intersect along their entire length and for most complex contoured bodies they will not so intersect. This new surface is reinforced by any suitable means and is disposed about a spindle coinciding with the longitudinal axis to form a new mandrel. Employing the new mandrel, filaments or tapes are wound directly onto the mandrel employing conventional equipment. The filaments or tapes are resin coated and are partially cured or B-staged to form a continuous filament wound preform. B-staged is the term commonly used to describe a semi-cured or partially cured state wherein the resin goes from a fluid state to an elastic state which provides a sufficiently strong bond but is nevertheless still flexible. The resulting preform is cut from the new mandrel along the intersection of the joined ends of the mandrel. This preform can then be wrapped about the original mold or mandrel, said wrapping being performed so that the longitudinal axis about which the preform is positioned is the original longitudinal axis of the mandrel from which the pattern was prepared. This transformation of axes is referred to as topological transform. This transform is accomplished by joining the interior and exterior edges of preform about the complex contoured body to reconstitute the original continuous path about said complex body. The preform is then finally cured about the mold to bind the filaments into a strong filament wound body in which the filaments are continuous from one end to the other.

In the process as heretofore described it is necessary to described a continuous path about the surface of the mandrel so that the pattern cut from the mandrel has a substantially constant width between the interior and exterior edges of said pattern as measured by a line perpendicular to any tangent to either edge of said pattern, said line passing through said pattern. Theoretically, this continuous path can be determined mathematically from the equation describing the surface of the complex body. Except in very simple cases, however, mathematical calculation of the continuous path is quite difficult. An approximation to the desired continuous path has been found which will permit describing of a path about the complex body and which will permit cutting of a pattern from said body from which a preform can be made which will conform to the surface of the body with substantially no gaps and no laps in the winding of the preform.

The approximation for laying the continuous path on said complex contoured body is described in relation to the angle of winding $\theta_1$ measured with respect to the longitudinal axis of the body at any peripheral line $L_1$ defined at the intersection of a plane perpendicular to the longitudinal axis of the body with the surface of the body. Any peripheral line $L_1$ about the complex contoured body has a total length $d_1$. Assuming a filament or tape having a thickness $t$, the number of filaments F required to cover line $L_1$, when the filaments cross line $L_1$ at an angle $\theta_1$ is defined by the expression $$F = d_1/f_1 \qquad (1)$$

where $f_1$ is the distance covered along line $L_1$ by one filament $f_1$ of thickness (t) at the angle $\theta_1$. In order for there to be no gaps or laps in a winding, the ratio of peripheral distance $d_1$ to the distance covered by the filament $f_1$ should be a constant. From the foregoing relationship the angle of wind $\theta_1$ at any peripheral line $L_n$ can be determined by the expression:

$$\cos \theta_n = ((F)(t)/d_n) \qquad (2)$$

where F and $t$ are constants as heretofore described and the subscript (n) refers to any given peripheral line about the surface of the complex contoured body.

When employing the foregoing method as an approximation of the true continuous path about the complex contoured body, it is to be understood that any number of peripheral lines can be employed. The greater the number of peripheral lines L that are drawn, the closer will be the continuous path described to the true continuous path whereby the width of the pattern recovered will be a true constant.

The following drawings will more fully illustrate this invention. Reference symbols refer to like parts wherever they occur.

FIG. 6 is a top view illustrative of a pattern that could be cut from the complex contoured body of FIG. 5 along the continuous path described in FIG. 5.

FIG. 7 is a diagrammatic view of a mandrel prepared from the pattern of FIG. 6.

FIG. 8 is a cross-sectional view of the mandrel of FIG. 7.

FIG. 9 is a diagrammatic view of winding of a preform on the mandrel illustrated in FIG. 7.

Figure 1:
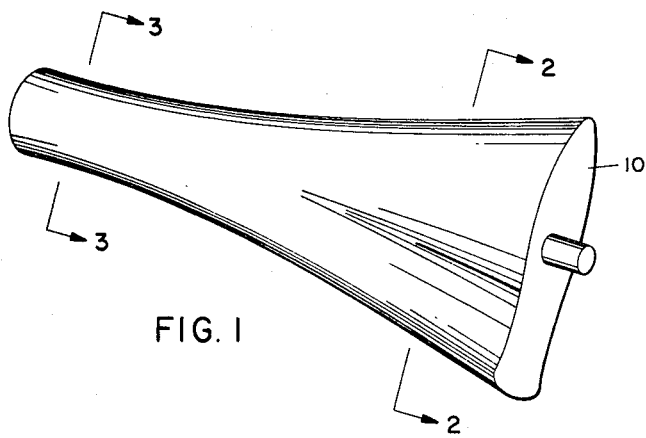
FIG. 1 is an elevation of a complex contoured body.
Figure 2:
FIGS. 2 and 3 illustrate cross-sections taken through the complex contoured body of FIG. 1.
Figure 3:
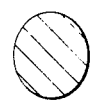

In FIG. 1 a mandrel 10 is illustrated having the shape of a complex contoured body. FIG. 2 illustrates a cross-section through the mandrel of FIG. 1 at lines 2—2. FIG. 3 illustrates a cross-section through the mandrel of FIG. 1 at lines 3—3.

Figure 4:
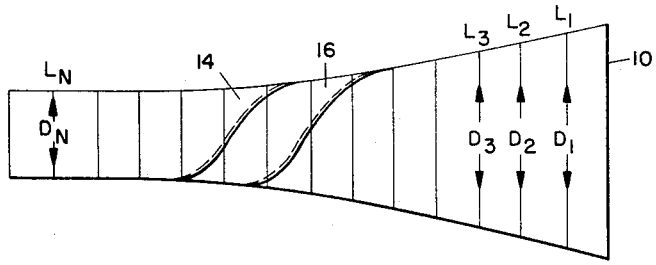
FIG. 4 is a front view of the complex contoured body of FIG. 1 which has been covered with a cloth and marked with peripheral lines about the body.

In FIG. 4 the mandrel 10 is shown covered with a cloth which has been resin impregnated to cause adherence of the cloth to the mandrel surface. The mandrel surface is marked with peripheral lines $L_1, L_2, L_3—L_n$, each line having a length $d_1, d_2, d_3—d_n$, said peripheral lines being spaced at equal incremental distances across the surface of the mandrel. Folds 14–16 caused by overlapping of the cloth covering are shown illustrating that such overlap can occur in winding the cloth covering about the mandrel. The interior surface of the resin impregnated cloth, however, adheres to the surface of the mandrel tightly as if no overlapping exists.

Figure 5:
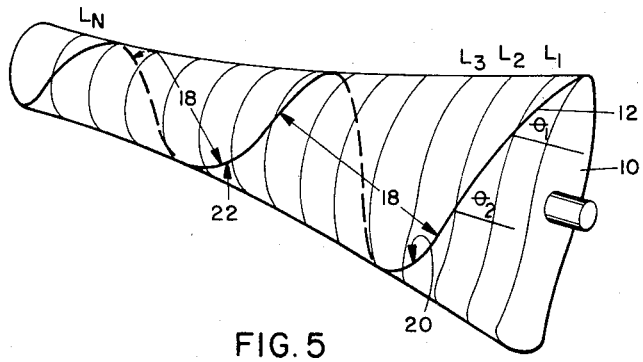
FIG. 5 is an elevation of the complex contoured body of FIG. 4 illustrating a continuous path about the longitudinal axis of said body.

FIG. 5 illustrates continuous path 12 drawn across the surface of covered mandrel 10 so that the distance (width) 18 between the interior edge 20 and exterior edge 22 of the pattern which could be cut from the mandrel 10 along continuous path 12 is substantially a constant.

Continuous path 12 is drawn across mandrel 10 as follows: An initial winding angle $\theta_1$ which is the angle of the filament measured with respect to the longitudinal axis of the mandrel, is established at some convenient point on line $L_1$. From the relationship heretofore described in equation (1) the number of filaments F of thickness (t) required to cover line $L_1$ having a peripheral length $d_1$ when crossing $L_1$ at an angle $\theta_1$ is thereby established. Holding F constant, the angles, $\theta_2—\theta_n$ are calculated. A continuous path 12 is then drawn starting from line $L_1$ such that the path is a smooth curve passing through lines, $L_1, L_2—L_n$ at the angles $\theta_1, \theta_2—\theta_n$ corresponding to lines $L_1, L_2—L_n$.

In FIG. 6 a pattern 24 cut from the cloth covering on mandrel 10 along continuous path 12 is shown after the pattern has been removed from the mandrel 10. The cured resin impregnated cloth remains as a unitary or one-piece pattern after cutting due to the bonding action of the resin. The interior edge 20, exterior edge 22, forward-end 26 and aft-end 28 of the pattern 24 are clearly identifiable.

FIG. 7 illustrates the topological transform that results from joining the forward-end 26 and aft-end 28 of pattern 24 about a longitudinal axis 30 and supporting said pattern to form a mandrel. The pattern 24 is shown as it would appear stretched over a mandrel 32 prepared from a rigid material and having the configuration of pattern 24 and which has undergone topological transform as heretofore described with the exception that the mandrel is made with a continuous surface to facilitate winding. The mandrel 32 has a spindle 33 centered on longitudinal axis 30. The mandrel edges conform to the interior edge 20 and exterior edge 22 of the pattern. The pattern ends 26 and 28 are joined and intersect along line 34. A gap 36 is shown illustrating discontinuity in the pattern that can result depending on the shape of the ends of the complex contoured body. The mandrel 32 prepared from pattern 24 has surface protrusions 38 illustrative of the surface of the mandrel 32 resulting from topological transform.

FIG. 8 is a cross-section taken through FIG. 7 at lines 8—8' further illustrating the mandrel 32 and surface protrusion 38. The mandrel surface 40 is supported to the mandrel spindle 33 by support members 42.

In FIG. 9 the mandrel 32 of FIG. 7 is shown as it might appear in a filament winding operation. The mandrel is illustrated as if the pattern 24 is again stretched over the surface of the mandrel as referred to in FIG. 7. The mandrel of FIG. 9 is rotated approximately 45° from its position in FIG. 7 so that protrusion 38 appears as part of the bottom edge of this view. Filament 44 is fed from spool 46 and is wound around the surface of mandrel 33 so that the individual filaments are in side-by-side relationship and are substantially parallel with the interior edge 20 and exterior edge 22 of the pattern 24. It is clear that some angle between adjacent windings about the mandrel exists, yet the filaments are defined as substantially parallel within this context. The filaments pass through a resin spray 48 prior to being wound about the mandrel 33. The resulting winding is cut from the mandrel along the pattern intersection 34 and along the non-intersecting edges 26 and 28. Filament 44 is stored on spool 46 which in turn is mounted on a spool pin 50 upstanding from a platform 52 of a filament feed mechanism. The spool 46 is loose on the spool pin 50 so that it is free to turn as the filament 44 is pulled from it. The platform 52 is mounted for sliding endwise or axially of a pair of rods 54 that are disposed parallel to the axis of the spindle 33 of mandrel 32, and which define the filament-laying axis along which the filament feed mechanism is moved. The platform 52 is adapted to be driven along the rods 54 by a drive link 56 that may be actuated by a programmed mechanism (not shown) whereby the platform 52 will traverse the mandrel 32 and filament 44 is laid onto the mandrel surface in side-by-side relationship.

The preforms of this invention are composite materials prepared from filaments and a resin employed in an amount sufficient to bind together the filaments of each layer as well as those of various superposed layers and to fill any interstices that may exist between any of the filaments. The preform is generally comprised of high tensile strength filaments with the quantity of resin being kept to the minimum necessary to provide a consolidated uniform preform. The resin can be applied to the filaments by any suitable means. Thus, for example, the filaments employed can be preimpregnated with resin or they can be sprayed with resin during the winding operation.

All types of fibers or filaments can be employed in producing the preforms of this invention. Particularly suitable materials are fibers characterized by a high tensile strength and light weight. Illustrative fibers having these characteristics are prepared from glass, boron, carbon, asbestos, aluminum oxide ($Al_2O_3$) and sapphire. These fibers or filaments can be employed in any configuration such as single filaments having a circular cross-section area or as tapes consisting of a single layer of oriented filaments, that is, filaments in parallel side-by-side relationship extending lengthwise of the tape.

The resins which can be employed as a binder in manufacturing the preforms of this invention are curable thermosetting resins such as epoxy polymers and thermoplastic resins. These resins bind the filaments comprising the preform together into a high modulus composite material. Thermosetting resins are preferred and are partially cured or B-staged to solidify the resin and to provide a preform which is structurally self-supporting. By the term "self-supporting preform" is meant that the composite comprised of numerous individual filaments and resin has the characteristics of a flexible, integral solid. The partially cured preform can be readily handled and stored in this condition. When ready for final use the preforms are assembled or employed as needed for a particular application and completely cured employing heat, pressure or a combination thereof. Thermoplastic resins used to prepare the filament wound preforms of this invention are employed in the fused state and are cooled to solidify the resin and to provide a preform which is self-supporting.

The method of making filament wound preforms heretofore described by preparing a mandrel based on the pattern cut from the complex contoured body and filament winding the preform as illustrated in FIG. 8 is preferred. While this process is undoubtedly the most convenient method for laying of filaments on the pattern or mandrel thus prepared, it is clear that preparation of a mandrel from the pattern cut from the complex contoured body is not the only way to utilize the pattern. Thus, when manufacturing small numbers of preforms, it may be desirable to use hand lay-up techniques to prepare the preform. In this method, filaments or tapes are laid from one end of the pattern to the other, said filaments being parallel with the interior edge and exterior edge of the pattern as herein defined. These filaments are laid in a side-by-side relationship. Each filament or tape is therefore substantially parallel to the next adjacent filament or tape. Thus, the process of this invention while particularly adaptable to manufacture of large numbers of preforms for complex contoured bodies employing conventional filament winding methods can be readily employed for preparing single or small numbers of preforms. Laying of filament on the pattern prepared from the complex contoured body can also be accomplished employing the device disclosed in the pending application of K.E. Moran; Ser. No. 745,854 entitled "Apparatus for Making Composite Filamentary Structures," now U.S. Pat. No. 3,521,877.

What I claim and desire to protect by Letters Patent is:

1. The process of preparing a filament wound preform for a complex contoured body said process comprising:
    a. making a mandrel shaped to the contoured surface of the complex contoured body,
    b. securing a covering to the surface of the mandrel so that said cover conforms to said mandrel surface,
    c. describing a continuous path on the surface of said covering about the entire longitudinal axis of said mandrel to define a pattern, said pattern having an interior edge and exterior edge that are formed by cutting along the continuous path and a forward-end and an aft-end, the width of the pattern measured between the interior edge and exterior edge of the pattern along a line through said pattern perpendicular to any tangent to either edge of the pattern being substantially constant except at the forward-end and the aft-end of the pattern,
    d. cutting the covering along the continuous path to make said pattern,
    e. laying filaments in side-by-side relationship lengthwise of said pattern from one edge to the other, and
    f. binding the filaments with a resin to provide a self-supporting preform for the complex contoured body.

2. The process of claim 1 wherein the resin employed for binding the filament is a thermosetting resin, said thermosetting resin being partially cured to provide the self-supporting preform.

3. The process of claim 1 wherein the resin employed for binding the filaments is a thermoplastic resin.

4. The process of claim 2 wherein the filaments are preimpregnated with a thermosetting resin prior to laying of the filaments in side-by-side relationship on the pattern.

5. The process of preparing a filament wound preform for a complex contoured body, said process comprising:
    a. making a first mandrel shaped to the contoured surface of the complex contoured body,
    b. securing a covering to the surface of the first mandrel so that said cover conforms to said surface,
    c. describing a continuous path on the surface of said covering about the entire longitudinal axis of said first mandrel to define a pattern, said pattern having an interior edge and exterior edge that are formed by cutting along the continuous path and a forward-end and an aft-end, the width of the pattern measured between the interior edge and exterior edge of the pattern along a line through said pattern perpendicular to any tangent to either edge of the pattern being substantially constant except at the forward-end and the aft-end of the pattern,
    d. cutting the covering along the continuous path to make said pattern,
    e. joining the forward-end and aft-end of said pattern about a longitudinal axis so as to form a continuous surface having ends corresponding to the interior and exterior edges of said pattern,
    f. making a second mandrel having a surface corresponding to said continuous surface and ends corresponding to the interior and exterior edges of said pattern,
    g. laying filaments in side-by-side relationship about said second mandrel, said filaments being laid in a direction substantially parallel to the ends of said second mandrel,
    h. binding the filaments with a resin to provide a self-supporting preform, and
    i. cutting the preform from the second mandrel along lines corresponding to the forward-end and aft-end of said pattern.

6. The process of claim 5 wherein the filaments are laid in side-by-side relationship about the second mandrel employing a filament winding apparatus.

7. The process of claim 6 in which the resin employed for binding the filaments is a thermosetting resin.

8. The process of claim 6 in which the resin employed for binding the filaments is a thermoplastic resin.

9. The process of claim 7 in which the covering secured to the surface of the first mandrel is a cloth which has been impregnated with a thermosetting resin, said resin impregnated cloth being cured so that the resulting resin cured covering when cut from said first mandrel along the continuous path results in a pliable and unitary pattern.

10. The process of preparing a filament wound preform for a complex contoured body, said process comprising:

a. making a first mandrel shaped to the contoured surface of the complex contoured body, b. securing a covering to the surface of the first mandrel, said cover conforming to said first mandrel surface, c. drawing a series of continuous peripheral lines, $L_1$ and $L_n$, about the surface of the covering of the first mandrel, said continuous peripheral lines being defined by the intersection at the surface of the first mandrel of a series of cross-sections through the first mandrel perpendicular to the longitudinal axis thereof, d. measuring the length (d) of each continuous peripheral line (L), e. establishing an angle of wind $\theta_1$ at a peripheral line $L_1$ having a length $d_1$, said angle of wind $\theta_1$ measured with respect to the longitudinal axis of the first mandrel, f. determining the number of filaments F of thickness $t$ required to cover line $L_1$ when laid at an angle $\theta_1$ from the relation $$F = (d_1 \cos \theta_1 / t)$$

g. determining the winding angles $\theta_2$ to $\theta_n$ for peripheral lines $L_2$ to $L_n$ from the relation $$\cos \theta_n = Ft/d_n$$

where F is the number of filaments determined from step (f), t is the filament thickness, and $d_n$ is the length of a peripheral line, h. laying a continuous path through peripheral lines $L_1$ to $L_n$, said continuous path crossing each peripheral line $L_1$ to $L_n$, at the determined winding angle $\theta_1$ to $\theta_n$ respectively, i. cutting the covering along the continuous path to make a pattern having an interior edge, exterior edge, forward-end and aft-end, j. laying filaments in side-by-side relationship lengthwise of said pattern substantially parallel to said interior and exterior edges, and k. binding the filaments with a resin to provide a self-supporting preform for a complex contoured body.

11. The process of claim 10 in which the filament wound preform is prepared from said pattern by the steps comprising:

a. joining the forward-end and aft-end of said pattern about a longitudinal axis so as to form a continuous surface having ends corresponding to the interior edge and exterior edge of said pattern, b. making a second mandrel having a surface corresponding to said continuous surface and ends corresponding to said interior and exterior edges of said pattern, c. laying filaments in side-by-side relationship about said second mandrel, said filaments being laid in a direction substantially parallel to the ends of said second mandrel, d. binding the filaments with a resin to provide a self-supporting preform, and e. cutting the resulting preform from the second mandrel along lines corresponding to the forward-end and aft-end of said pattern.

12. The process of claim 11 in which the filaments are laid in side-by-side relationship employing a filament winding apparatus.

13. The process of claim 12 in which the filaments are preimpregnated with resin prior to laying of the filaments in side-by-side relationship on the second mandrel.

14. The process of claim 13 in which the resin employed is a thermosetting resin.

15. The process of claim 13 in which the resin employed is a thermoplastic resin.

16. The process of claim 14 in which the covering secured to the surface of the first mandrel is a cloth winding which has been impregnated with a thermosetting resin, said resin impregnated cloth being cured so that the resulting resin cured covering when cut from said first mandrel along the continuous path results in a pliable unitary pattern.

* * * * *